(12) United States Patent
Gaugain et al.

(10) Patent No.: US 12,489,195 B1
(45) Date of Patent: Dec. 2, 2025

(54) MONOPOLE ANTENNA FOR A MOTOR-VEHICLE WHEEL UNIT

(71) Applicant: Continental Automotive Technologies GmbH, Hannover (DE)

(72) Inventors: Frédéric Gaugain, Toulouse (FR); Pascal Petitjean, Toulouse (FR); Frédéric Lathiere, Toulouse (FR); Clément Prince, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 19/253,663

(22) Filed: Jun. 27, 2025

(30) Foreign Application Priority Data

Jul. 18, 2024 (FR) ...................................... 2407911

(51) Int. Cl.
*H01Q 1/22* (2006.01)
*B60C 23/04* (2006.01)
*B60R 16/03* (2006.01)
*H01Q 9/42* (2006.01)
*H05K 1/02* (2006.01)

(52) U.S. Cl.
CPC ....... *H01Q 1/2241* (2013.01); *B60C 23/0452* (2013.01); *B60R 16/03* (2013.01); *H01Q 9/42* (2013.01); *H05K 1/0243* (2013.01); *H05K 2201/10098* (2013.01)

(58) Field of Classification Search
CPC ............ H01Q 1/22; H01Q 1/243; H01Q 9/42; H01Q 1/32; B60C 23/0452
See application file for complete search history.

(56) References Cited

U.S. PATENT DOCUMENTS

| | | | |
|---|---|---|---|
| 10,647,171 B2 * | 5/2020 | Chiu | B60C 23/0464 |
| 11,065,921 B2 * | 7/2021 | Saito | B60C 19/00 |
| 11,233,328 B2 * | 1/2022 | Samardzija | H01Q 5/30 |

(Continued)

FOREIGN PATENT DOCUMENTS

| | | |
|---|---|---|
| CN | 102738578 B | 3/2016 |
| CN | 208797175 U | 4/2019 |

(Continued)

OTHER PUBLICATIONS

French Search Report issued in corresponding Application No. FR2407911, Filed Jul. 18, 2024 dated Jan. 27, 2025, with Machine translation (32 pages).

*Primary Examiner* — Hasan Islam
(74) *Attorney, Agent, or Firm* — Buchanan Ingersoll & Rooney PC

(57) ABSTRACT

The invention relates to a monopole antenna (1) for a motor vehicle wheel unit, comprising a first end (10), a floating second end (20) and a body (30), the first end (10) extending in a first plane (P1) and comprising a power supply lug (110) and a support foot (120), the body (30) comprising a connecting wall (310), extending from the first end (10) in a second plane (P2) which is perpendicular to the first plane (P1) and connecting the power supply lug (110) and the support foot (120) by delimiting a recess (312), and a main portion (315) extending from the connecting wall (310) to the second end (20), the body (30) being configured so that the center of gravity of the antenna (1) is substantially in line with the support foot (110).

12 Claims, 4 Drawing Sheets

(56) References Cited

U.S. PATENT DOCUMENTS

| | | | |
|---|---|---|---|
| 11,276,938 B2 * | 3/2022 | Garrity | H01Q 1/38 |
| 2023/0202247 A1 | 6/2023 | Henriet et al. | |
| 2025/0070448 A1 | 2/2025 | Zhang et al. | |

FOREIGN PATENT DOCUMENTS

| | | | |
|---|---|---|---|
| CN | 209461637 U | 10/2019 | |
| CN | 216436134 U | 5/2022 | |
| CN | 217158646 U | 8/2022 | |
| JP | 4373814 B2 | 9/2009 | |
| WO | 2024008202 A1 | 1/2024 | |

\* cited by examiner

MONOPOLE ANTENNA FOR A MOTOR-VEHICLE WHEEL UNIT

This application claims priority to French Patent Application No FR2407911, filed Jul. 18, 2024, the contents of such application being incorporated by reference herein.

FIELD OF THE INVENTION

The present invention pertains to the field of motor vehicles and relates more particularly to a monopole antenna for a motor vehicle wheel unit.

BACKGROUND FOR THE INVENTION

It is known practice nowadays to equip motor vehicles with a sensor in each wheel in order to measure the pressure of the air inside the tire, or even its temperature or the acceleration of the wheel, and to communicate these measurements to an electronic control unit of the vehicle in order to inform the driver, for example in the event of a drop in the pressure of the air in one of the wheels.

An antenna is used to transmit the measurements from the sensor, called the wheel unit, to the electronic control unit. This antenna is mounted on an electrically powered printed circuit board.

The wheel unit communicates with the electronic control unit via the antenna at the frequencies of 315 MHz and 433 MHz or according to a communication protocol which makes possible short-distance bidirectional data exchange using ultra-high frequency or UHF radio waves, such as, for example, the Bluetooth® Low Energy (BLE) protocol at 2.4 GHz. A Bluetooth® Low Energy interface advantageously makes it possible to communicate bidirectionally and also with a smartphone.

In order to communicate at 315 MHz or 433 MHz, the wheel units usually comprise loop antennas. These loop antennas are made of bent metal and have two points of connection to the printed circuit board. Loop antennas currently used at the frequencies 315 MHz and 433 MHz have a low efficiency at these frequencies, of the order of 1%, but the propagation of waves at these frequencies on a vehicle is more favorable than at 2.4 GHz since it causes fewer losses. Thus, at 2.4 GHz, the efficiency of the antenna must be improved in order to compensate for these propagation losses, which requires an antenna of larger dimensions in order for it to be sufficiently efficient, which is not always suitable for an application in a motor vehicle where the space which is available for this type of equipment is limited.

In order to remedy these drawbacks at least in part, it is known practice to use monopole antennas for an application at 2.4 GHz, these antennas making it possible to obtain the best performance at this frequency. However, such an antenna is more prone to deform under the effects of the centrifugal force when the wheel is rotating since it has only one connection point, which makes it less rigid. These deformations while traveling imply a variability of the performance in the transmission of the messages to the electronic control unit. Then, these antennas may break after numerous cycles of deformation of the antenna while the vehicle is traveling.

Moreover, components are usually used to perform the function of matching between the antenna and the printed circuit. The communication technology which makes possible a short-distance bidirectional data exchange using ultra-high frequency or UHF radio waves, such as Bluetooth® Low Energy, requires the use of more components than an antenna operating at 315 MHz and 433 MHz. Now, it is necessary to limit the size of the printed circuit board in order to meet the constraints of use of the wheel unit, which consist in reducing the size and the weight of the components in order to withstand the centrifugal forces. These constraints make it all the more difficult to make and integrate an efficient and stable Bluetooth® Low Energy antenna.

A simple, reliable and efficient solution which makes it possible to remedy these drawbacks at least in part would therefore be advantageous.

SUMMARY OF THE INVENTION

To this end, the first subject of the invention is a monopole antenna for a motor vehicle wheel unit, said wheel unit comprising a printed circuit board connected to an electrical power supply and to at least one sensing element for measuring at least the pressure of the air inside the tire of the wheel, said antenna comprising a first end, a second end and a body extending between said first end and said second end, the second end being intended to remain electrically floating, the antenna being remarkable in that:
  the first end extends in a first plane and comprises a power supply lug, configured to be attached to said printed circuit board so as to form a first mechanical connection with the board and to be electrically powered by said electrical power supply via said printed circuit, and a support foot, configured to be attached to the printed circuit board so as to form a second mechanical connection with the board,
  the body comprises a connecting wall, extending from the first end in a second plane which is perpendicular to the first plane and connecting the power supply lug and the support foot by delimiting a recess between said power supply lug and said support foot, and a main portion extending from the connecting wall to the second end, the body being configured so that the center of gravity of the antenna is substantially in line with the support foot, preferably in line with the middle of the support line.

The second end is configured to be electrically floating, thereby making the antenna monopole, thus having better radiofrequency efficiency than the loop antennas, in particular at 2.4 GHz. The radiofrequency efficiency is thus greater than or equal to 60%. The antenna according to an aspect of the invention is thus a monopole antenna comprising at least two points of attachment to the printed circuit board, which makes it possible to attach it firmly to the board and thus to resist the accelerations of several hundred g which the rotating vehicle wheels may undergo. In addition, by being located at the center of gravity of the antenna, the support foot imparts considerable stability to the antenna, notably before it is attached, for example by soldering, and when the wheel is rotating. The antenna has a substantially open loop shape which makes it possible to return the second end to the plane of the first end, thus making it possible to save space for mounting the antenna in a small wheel unit.

Preferably, the antenna is in the form of a single electrically conductive piece of metal in order to be easy to manufacture and inexpensive in the event that the metal is steel or iron or another metal or metal alloy which is uncostly.

In one embodiment, the antenna further comprises a plating produced on the piece of metal, preferably a metal plating, for example tin.

According to one aspect of the invention, the portion of material delimiting the recess between the power supply lug and the support foot is configured to match the impedance of the antenna to the impedance of the printed circuit, notably at the output of the (BLE) integrated component, for example 50Ω, in order to avoid adding an impedance matching stage to the printed circuit board.

Preferably, the edge of the connecting wall delimiting the recess has a concave shape, preferably a U shape, making the recess convex, which makes it easy to manufacture the antenna.

In one embodiment, the support foot comprises a longitudinal portion extending in the first plane and at least one transverse portion, extending from said longitudinal portion, preferably perpendicularly to said longitudinal portion, also in the first plane.

For example, the support foot may advantageously have a T, h or H shape in order to provide sufficient stability.

In one embodiment, the second end is intended to and configured to remain free, that is to say not to be attached to the printed circuit board.

In one embodiment, the second end comprises an arm extending in the direction of the first end in a direction which is parallel to the second plane.

Advantageously, the arm is in the form of a plate extending in the same plane as the connecting wall. This notably makes it possible to maintain a constant distance between ground and the arm and to reduce the tolerance by eliminating the thickness of the solder paste, the tolerance coming only from the dimensions of the antenna.

In one embodiment, the second end extends in the same plane as the first end (i.e. in the first plane) and is configured to be attached to the printed circuit board, for example in the form of an attachment lug.

In one embodiment, the main portion comprises a central portion extending perpendicularly from the connecting wall and parallel to the first plane.

In one embodiment, the main portion comprises an oblique portion extending obliquely from the central portion in the direction of the first plane.

In one embodiment, the main portion comprises a reinforcing wall extending from at least part of an edge of the central portion and/or of the oblique wall.

In one embodiment, the main portion comprises an intermediate portion connecting the oblique portion to the second end.

Advantageously, the central portion and/or the oblique portion and/or the intermediate portion comprise at least one stiffener, for example a rib.

An aspect of the invention also relates to a wheel unit for a motor vehicle, said wheel unit comprising an electrical power supply, a printed circuit board connected to said electrical power supply, at least one sensing element configured to measure at least the pressure of the air inside the tire of the wheel and a monopole antenna as presented above.

According to one example of an embodiment, the printed circuit notably comprises an electronic component for making it possible for the antenna to communicate according to a communication protocol which makes possible a short-distance bidirectional data exchange using ultra-high frequency or UHF radio waves.

In one embodiment, the printed circuit notably comprises a Bluetooth® Low Energy electronic component in order to make it possible for the antenna to communicate according to the Bluetooth® Low Energy protocol.

An aspect of the invention also relates to a motor vehicle comprising at least one wheel unit as presented above, mounted in at least one of the wheels of the vehicle.

BRIEF DESCRIPTION OF THE DRAWINGS

Other features and advantages of aspects of the invention will become more apparent on reading the following description. It is purely illustrative and should be read with reference to the appended drawings, in which.

DETAILED DESCRIPTION OF EXEMPLARY EMBODIMENTS

Figure 1:
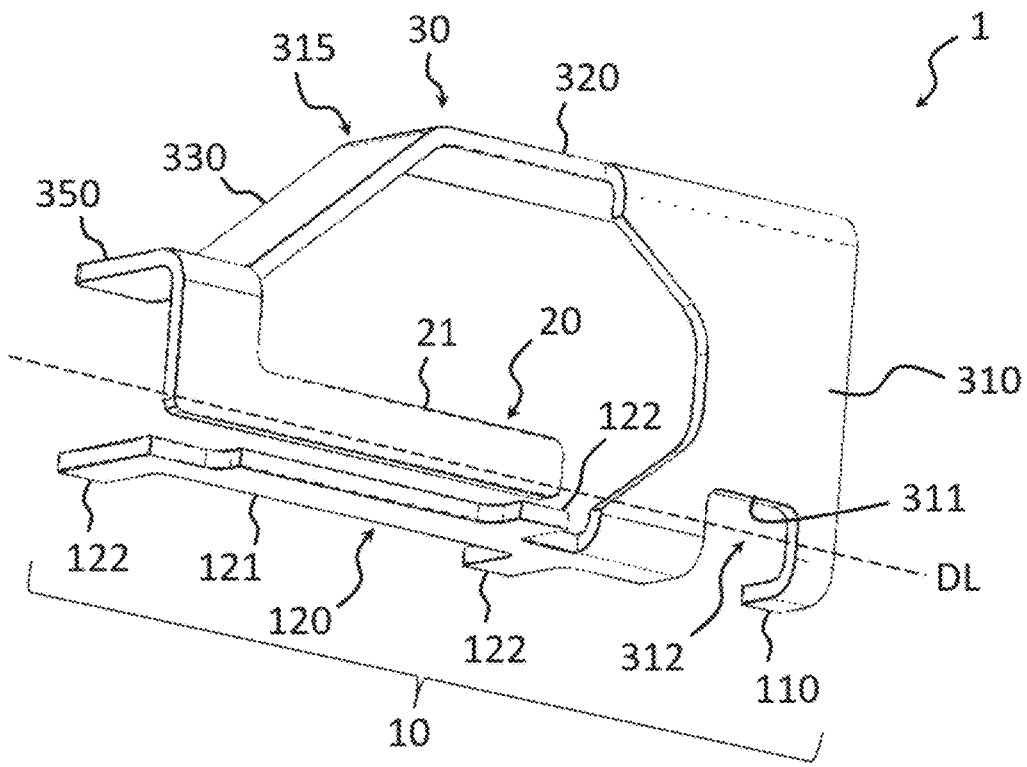
FIG. 1 schematically illustrates a first embodiment of the antenna according to the invention.

FIGS. 1 to 8 illustrate four examples of a monopole antenna 1 according to an aspect of the invention.

The monopole antenna 1 is configured to be used in a motor vehicle wheel unit.

Such a wheel unit makes it possible to measure the pressure of the air contained in the wheel and to send these measurements to an electronic control unit of the vehicle, in a manner which is known per se. The wheel unit may also, for example, measure the temperature of the air inside the tire and/or the acceleration of the wheel.

The wheel unit comprises a printed circuit connected to an electrical power supply and to a sensing element which makes it possible to measure the pressure values of the air contained in the wheel. The electrical power supply may, for example, be a button battery.

The printed circuit notably comprises an electronic component for making it possible for the antenna to communicate according to a communication protocol making possible short-distance bidirectional data exchange using ultra-high frequency or UHF radio waves and, for example, a Bluetooth® Low Energy electronic component for making it possible for the antenna 1 to communicate according to the Bluetooth® Low Energy protocol.

The antenna 1 is a single piece and is made from the same electrically conductive material, for example a metal such as steel, aluminum, iron or copper.

The antenna 1 comprises a first end 10, a second end 20 and a body 30 extending between said first end 10 and said second end 20 in a longitudinal direction DL.

The first end 10 extends in a first plane P1, which is in this example parallel to the longitudinal direction DL of the antenna 1. The first plane P1 and the longitudinal direction DL have been depicted only in certain figures for the sake of clarity.

The first end 10 comprises a power supply lug 110 and a support foot 120.

The power supply lug 110 is configured to be attached to said printed circuit board, for example by soldering, so as to form a first mechanical connection with the board. The power supply lug 110 is configured to be electrically powered by the electrical power supply of the wheel unit via the printed circuit.

The support foot 120 is configured to be attached to the printed circuit board, for example by soldering, so as to form a second mechanical connection with the board.

In the various embodiments illustrated in the figures, the support foot 120 has an h shape and comprises a longitudinal portion 121 extending in the plane of the first end 10 in the longitudinal direction DL of the antenna 1 and two transverse portions 122 extending perpendicularly from said longitudinal portion 121, each in an opposite direction.

The body 30 comprises a connecting wall 310 extending perpendicularly from the first end 10 in a second plane P2 and connecting the power supply lug 110 and the support foot 120, delimiting, on one of its edges 311 connecting said power supply lug 110 and said support foot 120, a recess 312 between the power supply lug 110 and the support foot 120. The second plane P2 has been depicted only in certain figures for the sake of clarity.

The shape and the dimensions of the recess 312 are configured to match the impedance of the antenna 1 to the impedance of the printed circuit. In other words, the volume and the shape of the absence of material between the power supply lug 110 and the support foot 120 are calculated in order for the impedance of the antenna 1 to be matched to the output impedance of the component which makes it possible for the antenna to communicate according to a communication protocol which makes possible a short-distance bidirectional data exchange using ultra-high frequency or UHF radio waves, such as the Bluetooth® Low Energy electronic component. The shape and the dimensions of the recess 312 impart capacitive and inductive effects which make it possible to match the impedance of the antenna 1 to the output impedance of the Bluetooth® Low Energy electronic component. For example, if the impedance of the antenna 1 must be 50 ohms, then the shape and the dimensions of the recess 312 are chosen to reach 50 ohms, for example by empirical tests.

In the various embodiments illustrated in the figures, the edge 311 delimiting the recess 312 has a concave shape in the shape of a U, imparting a convex shape to the recess 312.

The body 30 comprises a main portion 315 extending from the connecting wall 310 to the second end 20.

In the non-limiting examples of the figures, the main portion 315 comprises a central portion 320 and an oblique portion 330.

The central portion 320 extends perpendicularly to the connecting wall 310 and parallel to the first plane P1 of the first end 10.

The oblique portion 330 extends obliquely in the direction of the first plane P1 from the first end 10 to the second end 20.

The first end 10, the body 30 and the second end 20 form an open loop.

The body 30 is configured so that the center of gravity of the antenna 1 is substantially in line with the support foot 120, preferably substantially in line with the middle of the support foot 120, in order to ensure considerable stability of the antenna 1 when said antenna 1 is mounted on the printed circuit board.

The second end 20 is electrically floating when the antenna 1 is mounted on the printed circuit board, that is to say that it is not electrically connected to another element.

Figure 2:
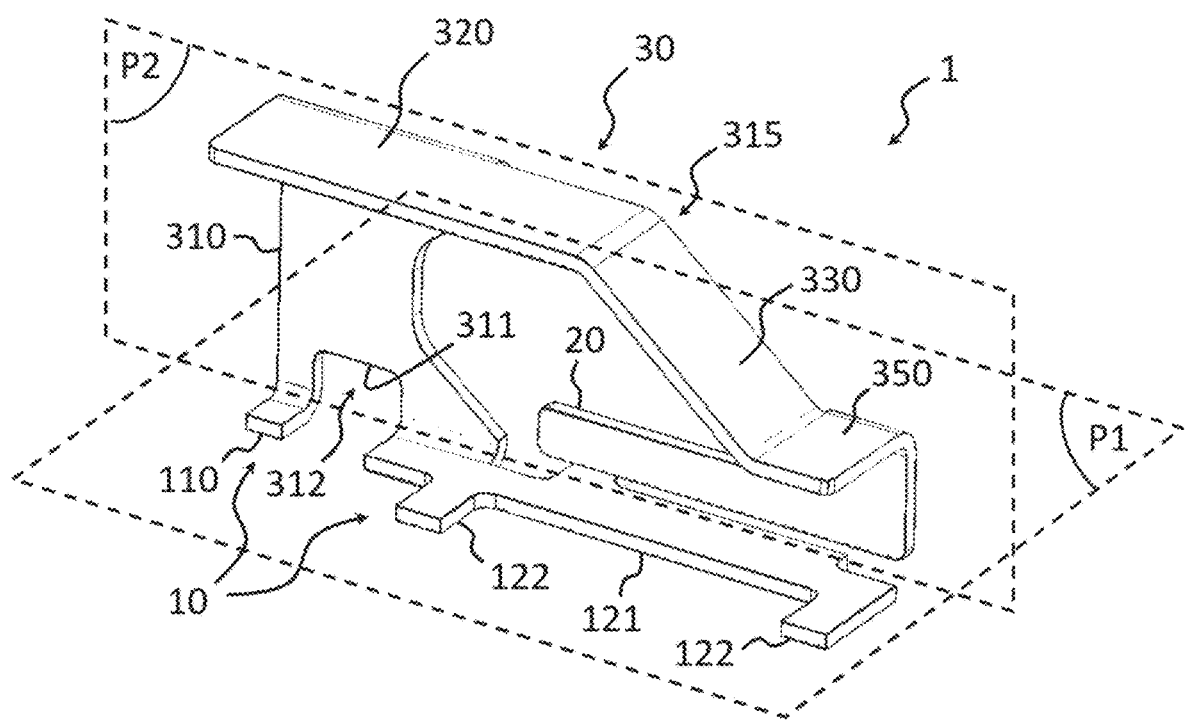
FIG. 2 is another perspective view of the antenna of FIG. 1.
Figure 3:
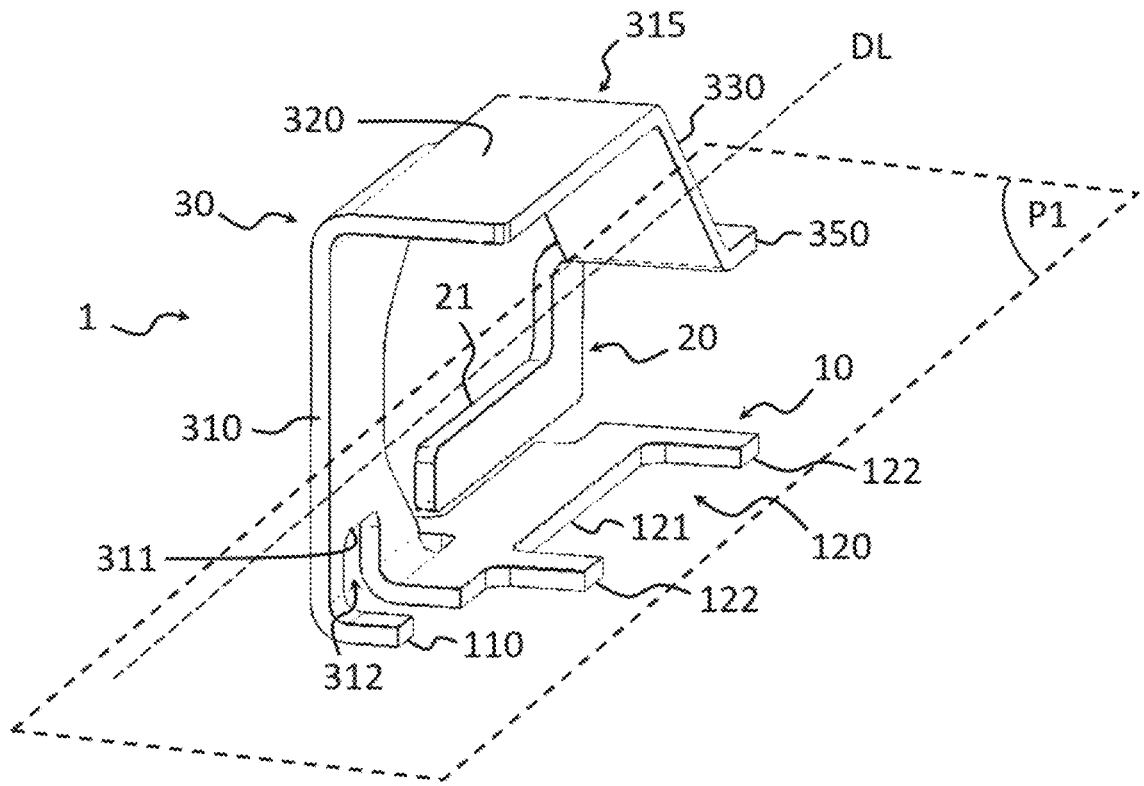
FIG. 3 is another perspective view of the antenna of FIG. 1.
Figure 4:
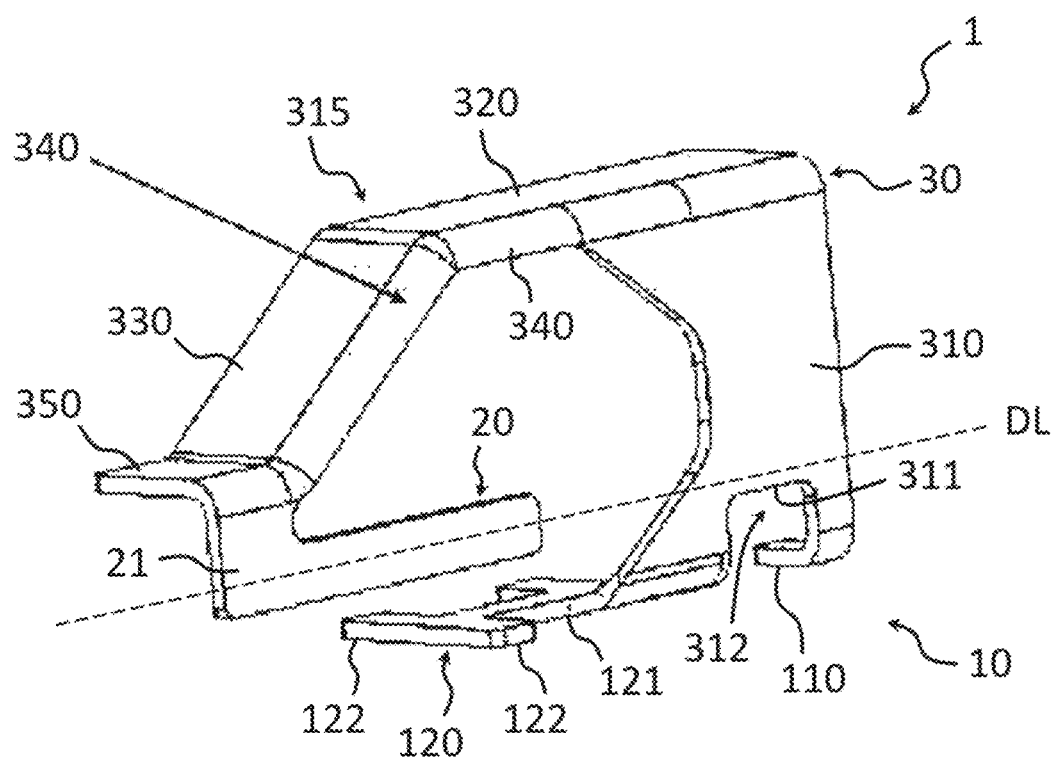
FIG. 4 schematically illustrates a second embodiment of the antenna according to the invention.

In the first embodiment illustrated in FIGS. 1 to 3 and in the second embodiment illustrated in FIG. 4, the second end 20 is intended to remain free when the antenna 1 is mounted on the printed circuit board.

In these two embodiments, the second end 20 comprises an arm 21 extending in the direction of the first end 10 in a direction which is parallel to the first plane P1 of the first end 10.

The arm 21 is formed by a flat projection of material which is in the form of a plate extending in the same plane as the connecting wall 310, namely the second plane P2.

Figure 5:
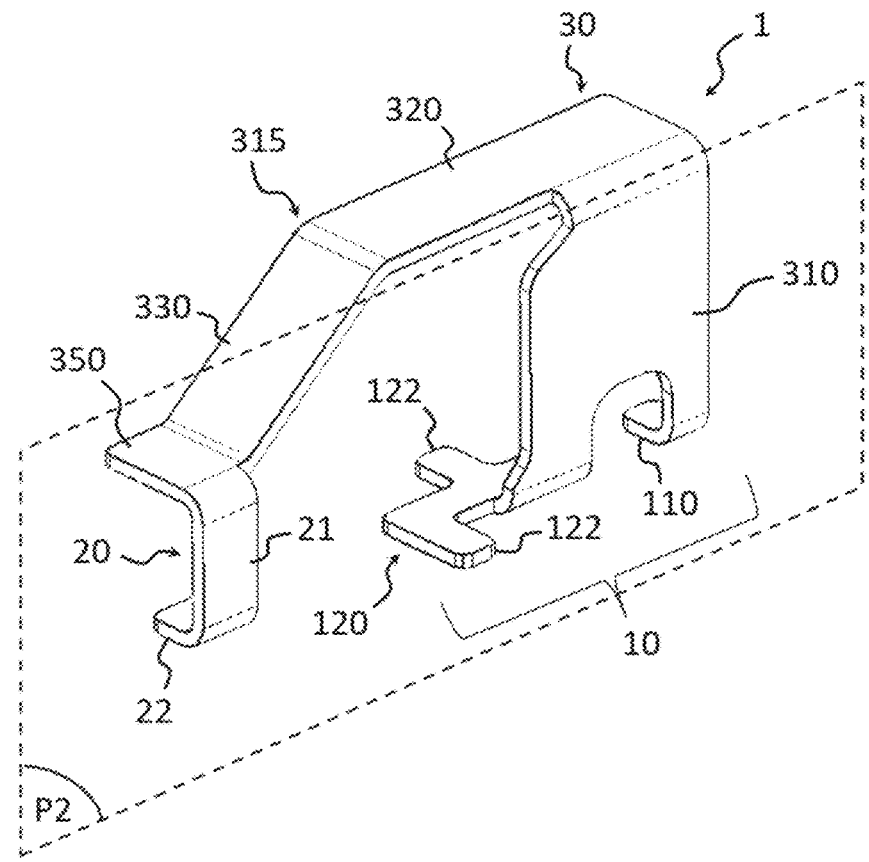
FIG. 5 schematically illustrates a third embodiment of the antenna according to the invention.
Figure 6:
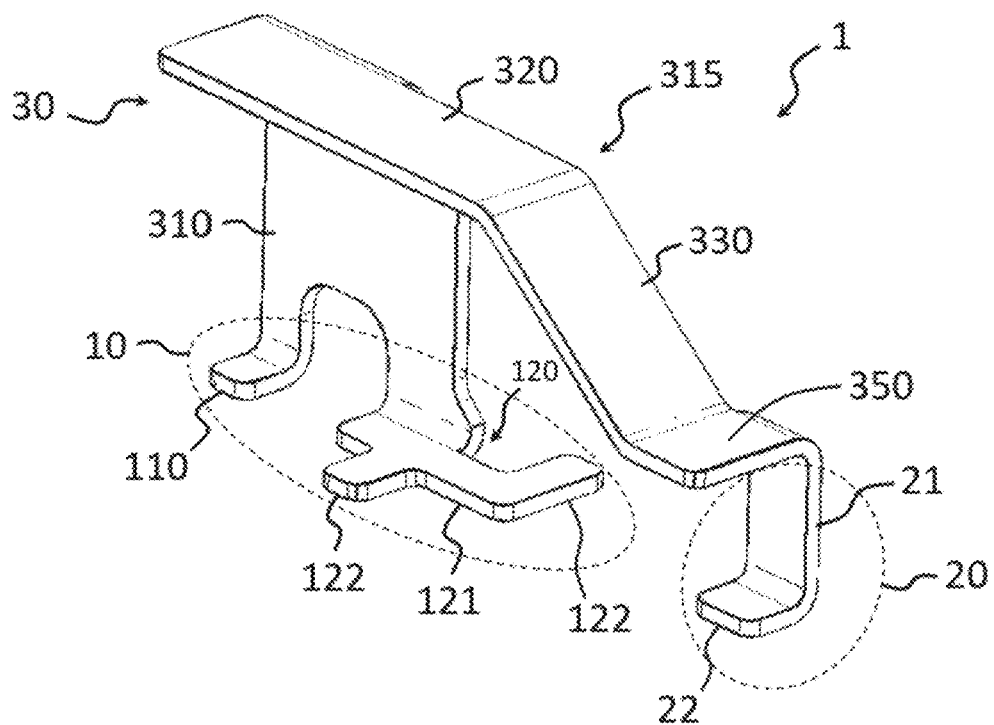
FIG. 6 is another perspective view of the antenna of FIG. 5.
Figure 7:
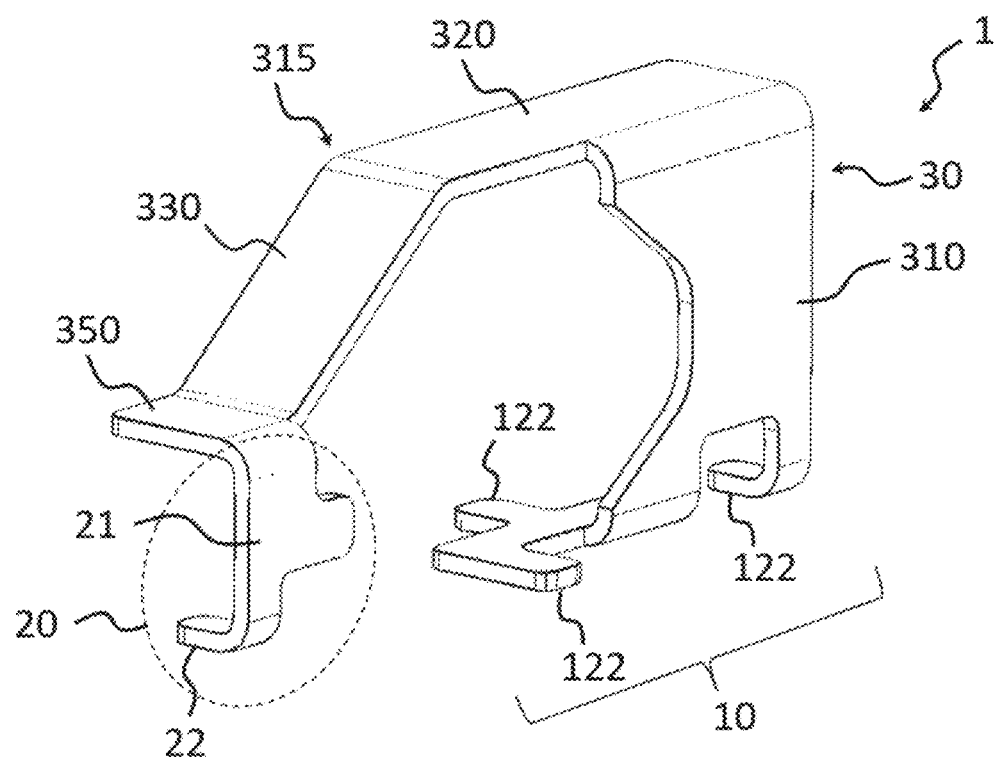
FIG. 7 schematically illustrates a fourth embodiment of the antenna according to the invention.
Figure 8:
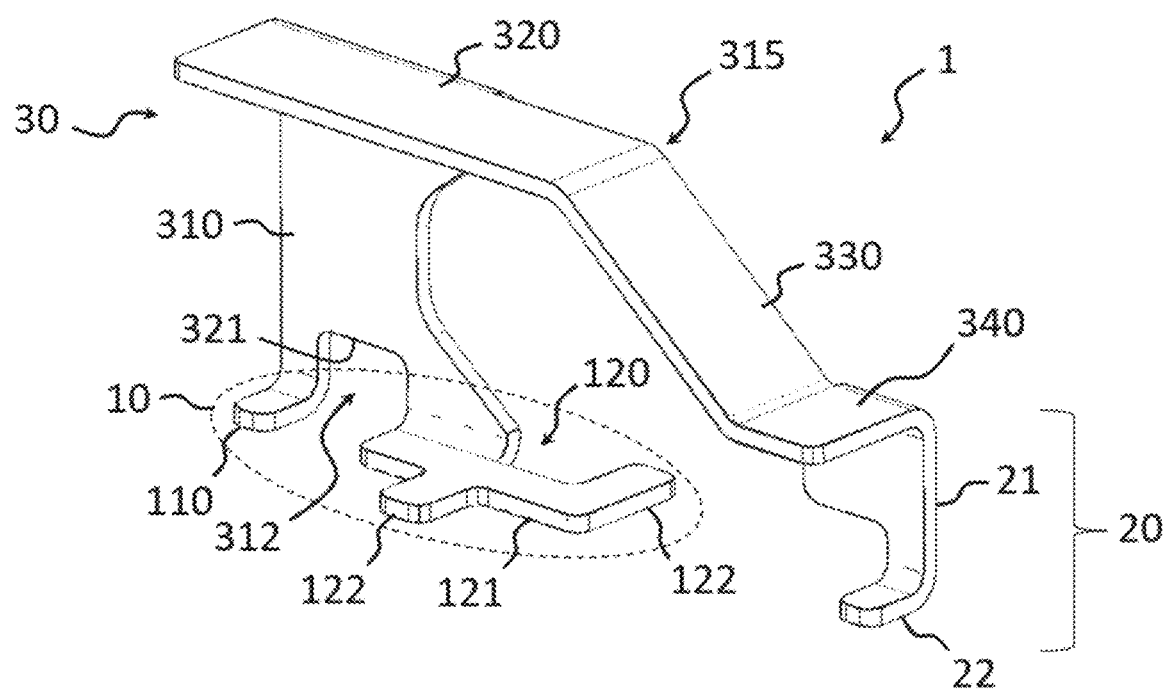
FIG. 8 is another perspective view of the antenna of FIG. 7.

In the third embodiment illustrated in FIGS. 5 and 6 and in the fourth embodiment illustrated in FIGS. 7 and 8, the second end 20 is in the form of an attachment lug 22 extending in the same plane as the first end 10, namely the first plane P1. The attachment lug 22 is configured to be attached to the printed circuit board, for example by soldering.

In the second embodiment illustrated in FIG. 4, the body 30 further comprises a reinforcing wall 340 extending in the second plane P2 of the connecting wall 310 along the central portion 320. This reinforcing wall 340 could also be present in the other embodiments. Likewise, other types of reinforcing elements could be used in any embodiment, such as, for example, a stiffener formed along the longitudinal median part of the central portion 320 and/or the oblique portion 330.

In the four embodiments illustrated in the figures, the body 30 comprises an intermediate portion 350 connecting the oblique portion 330 and the second end 20. The intermediate portion 350 extends parallel to the first plane P1 of the first end 10 and makes it possible to geometrically adapt the shape of the antenna 1, notably the positioning of the second end 20 with respect to the remainder of the antenna 1 and notably with respect to the connecting wall 310.

The invention therefore makes it possible to make an efficient monopole antenna 1 for a wheel unit and which can be firmly attached to the printed circuit board while at the same time simply making possible impedance matching to the output

The invention claimed is:

1. A monopole antenna for a motor vehicle wheel unit, said wheel unit comprising a printed circuit board connected to an electrical power supply and to at least one sensing element for measuring at least air pressure inside a tire of the wheel unit, said antenna comprising:
   a first end,
   a second end, and
   a body extending between said first end and said second end, the second end being intended to remain electrically floating such that the second end is an open end, wherein,
   the first end extends in a first plane and comprises a power supply lug, configured to be attached to said printed circuit board so as to form a first mechanical connection with the printed circuit board and to be electrically powered by said electrical power supply via said printed circuit board, and a support foot, configured to be attached to the printed circuit board so as to form a second mechanical connection with the printed circuit board,
   the body comprises a connecting wall, extending from the first end in a second plane which is perpendicular to the first plane and connecting the power supply lug and the support foot by delimiting a recess between said power supply lug and said support foot, and a main portion extending from the connecting wall to the second end, the body being configured so that a center of gravity of the antenna is substantially in line with the support foot.

2. The antenna as claimed in claim 1, wherein the edge of the connecting wall delimiting the recess has a concave shape, preferably a U shape.

3. The antenna as claimed claim 1, wherein the support foot comprises a longitudinal portion extending in the first plane and at least one transverse portion, extending from said longitudinal portion also in the first plane.

4. The antenna as claimed in claim 1, wherein the second end comprises an arm extending in a direction toward the first end such that the arm is parallel to the second plane.

5. The antenna as claimed in claim 4, wherein the arm is in the form of a plate extending in the same plane as the connecting wall.

6. The antenna as claimed in claim 1, wherein the second end extends in the same plane as the first end and is configured to be attached to the printed circuit board.

7. The antenna as claimed in claim 1, wherein the main portion comprises a central portion extending perpendicularly from the connecting wall and parallel to the first plane.

8. The antenna as claimed in claim 7, wherein the main portion comprises an oblique portion extending obliquely from the central portion in the direction of the first plane.

9. The antenna as claimed in claim 7, wherein the main portion comprises a reinforcing wall extending from at least part of an edge of the central portion and/or of the oblique wall.

10. The antenna as claimed in claim 1, wherein the main portion comprises an intermediate portion connecting the oblique portion to the second end.

11. A wheel unit for a motor vehicle, said wheel unit comprising:
   an electrical power supply,
   a printed circuit board connected to said electrical power supply,
   at least one sensing element configured to measure at least air pressure inside a tire of the wheel unit, and
   a monopole antenna comprising:
   a first end,
   a second end, and
   a body extending between said first end and said second end, the second end being intended to remain electrically floating such that the second end is an open end, wherein,
   the first end extends in a first plane and comprises a power supply lug, configured to be attached to said printed circuit board so as to form a first mechanical connection with the printed circuit board and to be electrically powered by said electrical power supply via said printed circuit board, and a support foot, configured to be attached to the printed circuit board so as to form a second mechanical connection with the printed circuit board,
   the body comprises a connecting wall, extending from the first end in a second plane which is perpendicular to the first plane and connecting the power supply lug and the support foot by delimiting a recess between said power supply lug and said support foot, and a main portion extending from the connecting wall to the second end, the body being configured so that a center of gravity of the antenna is substantially in line with the support foot.

12. A motor vehicle comprising the wheel unit as claimed in claim 11, further mounted in at least one of the wheels of the vehicle.

* * * * *